(12) United States Patent
Kim et al.

(10) Patent No.: US 10,056,647 B2
(45) Date of Patent: Aug. 21, 2018

(54) ELECTROLYTE FOR RECHARGEABLE LITHIUM BATTERY AND RECHARGEABLE LITHIUM BATTERY INCLUDING SAME

(71) Applicant: Samsung SDI Co., Ltd., Yongin-si, Gyeonggi-do (KR)

(72) Inventors: Duck-Hyun Kim, Yongin-si (KR); Moon-Sung Kim, Yongin-si (KR); E-Rang Cho, Yongin-si (KR); Jeong-Hye Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 818 days.

(21) Appl. No.: 14/536,278

(22) Filed: Nov. 7, 2014

(65) Prior Publication Data
US 2015/0140395 A1    May 21, 2015

(30) Foreign Application Priority Data
Nov. 20, 2013  (KR) ........................ 10-2013-0141453

(51) Int. Cl.
*H01M 10/0567*  (2010.01)
*H01M 10/42*    (2006.01)
*H01M 10/0569*  (2010.01)
*H01M 4/131*    (2010.01)
*H01M 4/133*    (2010.01)

(52) U.S. Cl.
CPC ... *H01M 10/0567* (2013.01); *H01M 10/4235* (2013.01); *H01M 4/131* (2013.01); *H01M 4/133* (2013.01); *H01M 10/0569* (2013.01); *H01M 2220/30* (2013.01); *H01M 2300/004* (2013.01); *H01M 2300/0025* (2013.01)

(58) Field of Classification Search
CPC ......... H01M 10/0567; H01M 10/0569; H01M 10/4235; H01M 4/131; H01M 4/133; H01M 2300/0025; H01M 2220/30
See application file for complete search history.

(56) References Cited

U.S. PATENT DOCUMENTS

| 4,762,633 A | 8/1988 | Shinozaki et al. |
| 2012/0208080 A1 | 8/2012 | Park et al. |
| 2013/0260218 A1* | 10/2013 | Hashizume ........... H01M 4/485 429/163 |

FOREIGN PATENT DOCUMENTS

| JP | 62-80977 A | 4/1987 |
| JP | 62-217575 A | 9/1987 |
| JP | 2014-13719 | * 1/2014 |
| KR | 2001-0024061 A | 3/2001 |
| KR | 10-0976959 B1 | 8/2010 |
| KR | 10-2012-0094331 A | 8/2012 |
| KR | 10-2012-0110874 A | 10/2012 |
| KR | 20130120172 | * 11/2013 |
| WO | WO-0157947 A1 * | 8/2001 ........... C07C 257/14 |
| WO | WO 2010/110388 A1 | 9/2010 |

OTHER PUBLICATIONS

Korean Patent Abstracts No. 10-2009-0080868 A for Patent No. 10-0976959 B1, Aug. 18, 2010, 2 Pages.
KIPO Notice of Allowance dated Dec. 5, 2016, for corresponding Korean Patent Application No. 10-2013-0141453 (5 pages).

* cited by examiner

*Primary Examiner* — Laura Weiner
(74) *Attorney, Agent, or Firm* — Lewis Roca Rothgerber Christie LLP

(57) ABSTRACT

An electrolyte for a rechargeable lithium battery includes a lithium salt, a non-aqueous organic solvent, and an additive, where the additive includes a compound represented by Chemical Formula 1. A rechargeable lithium battery including the electrolyte includes a positive electrode including a positive active material, a negative electrode including a negative active material, and the electrolyte.

Chemical Formula 1

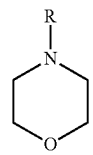

6 Claims, 12 Drawing Sheets

ELECTROLYTE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2013-0141453, filed in the Korean Intellectual Property Office on Nov. 20, 2013, the entire content of which is incorporated herein by reference.

BACKGROUND

1. Field

An electrolyte for a rechargeable lithium battery and a rechargeable lithium battery including the same are disclosed.

2. Description of the Related Art

Batteries transform chemical energy generated from an electrochemical redox reaction (a reduction-oxidation reaction) of a chemical material in the battery into electrical energy. Such batteries may be characterized as a primary battery, which is designed to be disposed after all (or substantially all) of the energy of the battery is consumed, and a rechargeable battery (e.g., a secondary battery), which may be recharged many times. The rechargeable battery may be charged/discharged many times based on the reversible transformation between chemical energy and electrical energy.

Recent developments in high-tech electronics have allowed electronic devices to become small and light in weight, which, in part, leads to an increase in the number of portable electronic devices. As a power source for such portable electronic devices, the demand for batteries with high energy density is increasing and research on lithium rechargeable batteries is underway.

A rechargeable lithium battery can be manufactured by injecting an electrolyte into an electrode assembly, which includes a positive electrode including a positive active material capable of intercalating/deintercalating lithium and a negative electrode including a negative active material capable of intercalating/deintercalating lithium.

The electrolyte can include an organic solvent in which a lithium salt is dissolved, and determine the stability and performance of the rechargeable lithium battery. For example, research on an electrolyte for improving the cycle-life and stability of a rechargeable lithium battery has been actively made.

SUMMARY

An aspect of an embodiment is directed toward an electrolyte for a rechargeable lithium battery having improved safety and cycle-life characteristics.

Another aspect of an embodiment is directed toward a rechargeable lithium battery including the electrolyte.

In one embodiment, an electrolyte for a rechargeable lithium battery includes a lithium salt, a non-aqueous organic solvent, and an additive. The additive may include a compound represented by Chemical Formula 1.

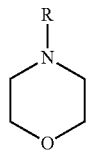

Chemical Formula 1

In Chemical Formula 1, R may include —CN, —NC, —NCS, —SCN, a sulfonic acid group (—$SO_3H$), a C1 to C8 alkyl group substituted with a functional group, a C1 to C8 alkyl group including a F, O, S or N atom, a C2 to C12 alkenyl group substituted with a functional group, a C2 to C12 alkenyl group including a F, O, S or N atom, a C2 to C12 alkynyl group substituted with a functional group, a C2 to C12 alkynyl group including a F, O, S or N atom, a C1 to C12 alkoxy group substituted with a functional group, a C1 to C12 alkoxy group including a F, O, S or N atom, or a combination thereof.

The functional group may include —CN, —NC, —NCS, —SCN, or a sulfonic acid group (—$SO_3H$).

For example, in Chemical Formula 1, R may include —CN, —NC, —NCS, —SCN, a C1 to C8 alkyl group substituted with a functional group, a C2 to C12 alkenyl group substituted with a functional group, a C2 to C12 alkynyl group substituted with a functional group, a C1 to C12 alkoxy group substituted with a functional group, or a combination thereof. The functional group includes —CN, —NC, —NCS, or —SCN.

The compound represented by the above Chemical Formula 1 may be present in the electrolyte in an amount of about 0.1 parts by weight to about 10 parts by weight based on 100 parts by weight of the non-aqueous organic solvent.

The additive may further include an other additive including vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluoroborate, vinylethylene carbonate, fluoroethylene carbonate, difluoroethylene carbonate, fluorodimethyl carbonate, fluoroethylmethyl carbonate, or a mixture thereof.

The other additive may be present in the electrolyte in an amount of about 0.1 parts by weight to about 10 parts by weight based on 100 parts by weight of the non-aqueous organic solvent.

In another embodiment, a rechargeable lithium battery includes a positive electrode, a negative electrode, and the electrolyte.

The rechargeable lithium battery may further include a solid electrolyte interface (SEI) protection film on a surface of the negative electrode.

The rechargeable lithium battery may further include a solid electrolyte interface (SEI) protection film on a surface of the positive electrode.

The SEI protection film on the surface of the positive electrode may include a coordination compound including a metal including Co, Mn, and/or Ni and a functional group coordinated to the metal, the functional group including —CN, —NC, —NCS, and/or —SCN.

The electrolyte for a rechargeable lithium battery according to an embodiment and a rechargeable lithium battery including the electrolyte have improved cycle-life characteristics and safety.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
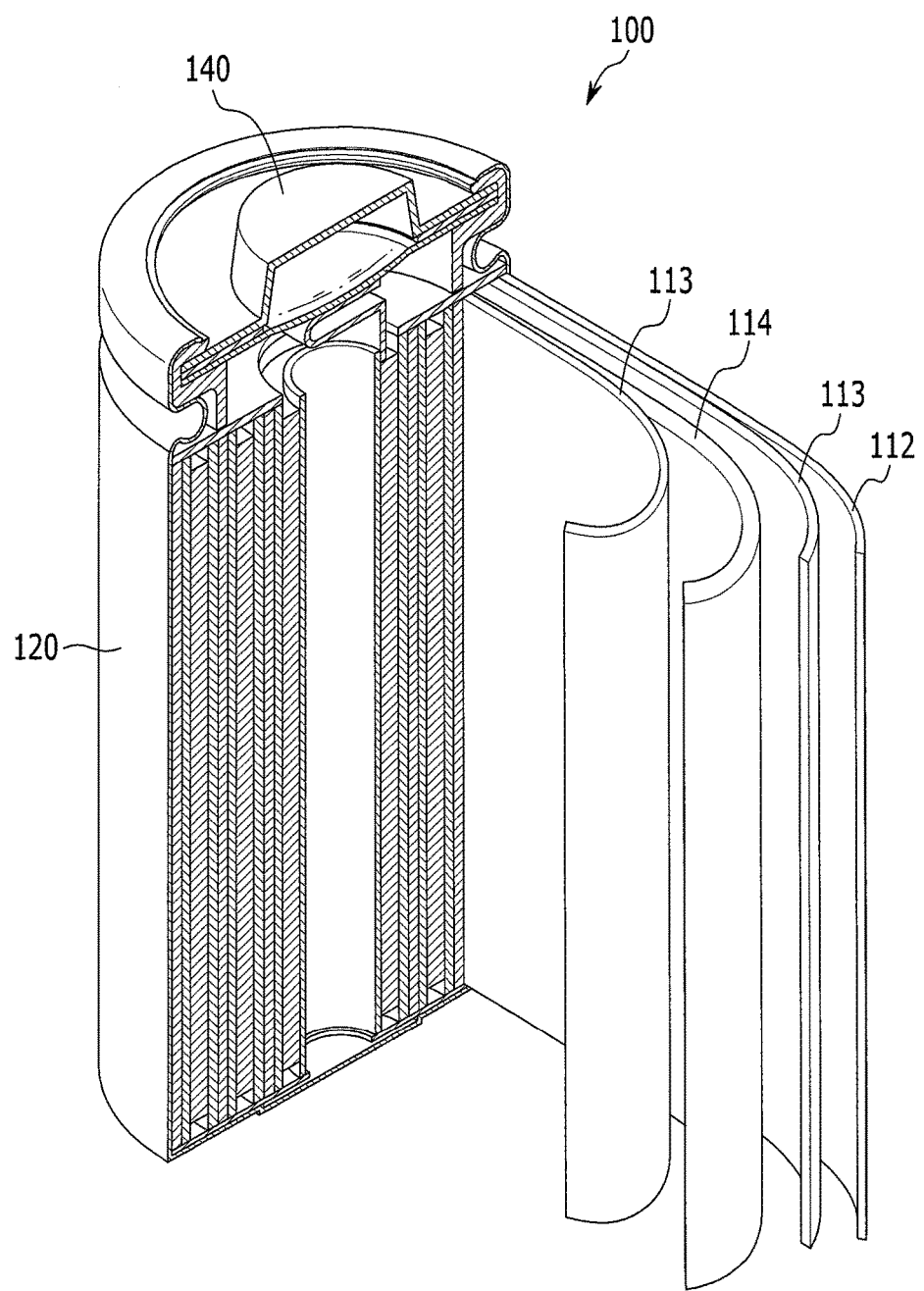
FIG. 1 is a schematic view showing a rechargeable lithium battery according to one embodiment.

Hereinafter, certain embodiments are described, examples of which are illustrated in the accompanying drawings. However, these embodiments are examples, and this disclosure is not limited thereto. As those skilled in the art would recognize, the described embodiments may be modified in many ways and should therefore not be construed as limiting.

As used herein, when a definition is not otherwise provided, the term "single bond" as used with respect to the linking group refers to two components being directly linked by a single bond without a separate linking group, and, in those instances, the linking group does not include alkylene, and the like.

As used herein, when a definition is not otherwise provided, the term "substituted" refers to substitution with a C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; or a halogen, in place of a hydrogen atom. A substituted compound may have more than one hydrogen atom substituted with one of the above-described substituents.

As used herein, when a definition is not otherwise provided, the term "alkyl group" refers to a "saturated alkyl group," for example, an alkyl group that does not include an alkenyl group or an alkynyl group, or an "unsaturated alkyl group" including at least one of an alkenyl group or an alkynyl group. The term "alkenyl group" refers to a substituent in which at least two carbon atoms are bonded together with at least one carbon-carbon double bond, and the term "alkynyl group" refers to a substituent in which at least two carbon atoms are bonded together with at least one carbon-carbon triple bond. The alkyl group may be a branched, linear, or cyclic alkyl group.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it may be directly on the other element or be indirectly on the other element with one or more intervening elements therebetween. When an element is referred to as being "directly on" another element, there are no intervening elements present.

An electrolyte for a rechargeable lithium battery according to one embodiment includes a lithium salt, a non-aqueous organic solvent, and an additive.

Additive

The additive may include a compound represented by the following Chemical Formula 1.

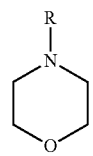

Chemical Formula 1

In the above Chemical Formula 1, R may include —CN, —NC, —NCS, —SCN, a sulfonic acid group (—SO$_3$H), a C1 to C8 alkyl group substituted with a functional group, a C1 to C8 alkyl group including a F, O, S or N atom, a C2 to C12 alkenyl group substituted with a functional group, a C2 to C12 alkenyl group including a F, O, S or N atom, a C2 to C12 alkynyl group substituted with a functional group, a C2 to C12 alkynyl group including a F, O, S or N atom, a C1 to C12 alkoxy group substituted with a functional group, a C1 to C12 alkoxy group including a F, O, S or N atom, or a combination thereof, but the present disclosure is not limited thereto. In some embodiments, the functional group in the foregoing examples includes —CN, —NC, —NCS, —SCN, or a sulfonic acid group (—SO$_3$H).

According to embodiments of the present disclosure, the morpholine derivative represented by the above Chemical Formula 1 is used as an additive in an electrolyte and thereby cycle-life characteristics and safety of a rechargeable lithium battery including the electrolyte may be improved.

For example, in Chemical Formula 1, R may include —CN, —NC, —NCS, —SCN, a C1 to C8 alkyl group substituted with a functional group, a C2 to C12 alkenyl group substituted with a functional group, a C2 to C12 alkynyl group substituted with a functional group, a C1 to C12 alkoxy group substituted with a functional group, or a combination thereof. The functional group includes —CN, —NC, —NCS, or —SCN.

The morpholine compound including a functional group such as —CN, —NC, —NCS or —SCN forms a solid electrolyte interface (SEI) protection film on a surface of a negative electrode as a result of a decomposition reaction during the initial formation process. The SEI protection film may suppress (or reduce) decomposition of other electrolyte materials and salts.

In addition, the rechargeable lithium battery may further include a SEI protection film on a surface of a positive electrode. The SEI protection film positioned on the surface of the positive electrode may include a coordination compound including a metal including Co, Mn, and/or Ni, and a functional group including —CN, —NC, —NCS, and/or —SCN that is coordinated to metal. The functional group such as —CN, —NC, —NCS, —SCN, or a sulfonic acid group (—SO₃H) included in the compound represented by the above Chemical Formula 1 may form a coordination bond with a metal (e.g., cobalt (Co)) of a positive electrode and, thus, may form a coordination-type solid electrolyte interface (SEI) protection film on the surface of the positive electrode, thereby improving the stability of the positive electrode.

In this way, because the safety of the positive and negative electrodes is simultaneously (or concurrently) improved by using an additive including the compound represented by the above Chemical Formula 1, an electrolyte for a rechargeable lithium battery and a rechargeable lithium battery including the same and having good cycle-life characteristics and penetration safety may be obtained.

The compound represented by the above Chemical Formula 1 may be included (e.g., present) in the electrolyte in an amount of about 0.1 parts by weight to about 10 parts by weight and, for example, about 0.2 parts by weight to about 3 parts by weight, based on 100 parts by weight of the non-aqueous organic solvent of the electrolyte.

When the compound represented by the above Chemical Formula 1 is included within any of the foregoing ranges, a rechargeable lithium battery may maintain good property balance and have improved cycle-life characteristic and safety.

The additive may further include an other additive including vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluoroborate, vinylethylene carbonate, fluoroethylene carbonate, difluoroethylene carbonate, fluorodimethyl carbonate, fluoroethylmethyl carbonate, or a mixture thereof, but the other additive is not limited thereto.

The other additive may be included (e.g., present) in the electrolyte in an amount of about 0.1 parts by weight to about 10 parts by weight based on 100 parts by weight of the non-aqueous organic solvent.

When the other additive is included within any of the foregoing ranges, battery safety may be improved.

Non-Aqueous Organic Solvent

The non-aqueous organic solvent may include a carbonate-based, ester-based, ether-based, ketone-based, alcohol-based, and/or aprotic solvent, but the non-aqueous organic solvent is not limited thereto. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like, but the carbonate-based solvent is not limited thereto. The ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and/or the like, but the ester-based solvent is not limited thereto. The ether-based solvent may include dibutyl ether, tetraglyme, diglyme, dimethoxyethane, 2-methyltetrahydrofuran, tetrahydrofuran, and/or the like, but the ether-based solvent is not limited thereto. The ketone-based solvent may include cyclohexanone, and/or the like, but the ketone-based solvent is not limited thereto. The alcohol-based solvent may include ethanol, isopropyl alcohol, and/or the like, but the alcohol-based solvent is not limited thereto. The aprotic solvent may include nitriles such as R—CN (where R includes a hydrocarbon group having a C2 to C20 linear, branched, or cyclic structure, and may include a double bond, an aromatic ring, or an ether bond) and/or the like, amides such as dimethylformamide and/or the like, dioxolanes such as 1,3-dioxolane and/or the like, sulfolanes, and/or the like, but the aprotic solvent is not limited thereto.

The non-aqueous organic solvent may be used singularly or in a mixture. When the organic solvent is used in a mixture, a mixing ratio of the mixture may be controlled in accordance with a desirable (or suitable) battery performance.

The carbonate-based solvent can be prepared by mixing a cyclic carbonate and a linear carbonate. The cyclic carbonate and the linear carbonate can be mixed together in a volume ratio of about 1:1 to about 1:9. Within the foregoing range, performance of the electrolyte may be improved.

The non-aqueous organic electrolyte may be further prepared by mixing the carbonate-based solvent with an aromatic hydrocarbon-based solvent. The carbonate-based and the aromatic hydrocarbon-based solvents may be mixed together in a volume ratio of about 1:1 to about 30:1.

The aromatic hydrocarbon-based organic solvent may include an aromatic hydrocarbon-based compound represented by the following Chemical Formula A.

Chemical Formula A

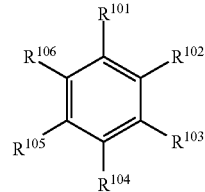

In Chemical Formula A, $R^{101}$ to $R^{106}$ are each independently a hydrogen atom, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof. However, the aromatic hydrocarbon-based organic solvent is not limited thereto.

In order to improve (or further improve) battery cycle-life, the non-aqueous electrolyte may further include vinylene carbonate or an ethylene carbonate-based compound represented by the following Chemical Formula 2.

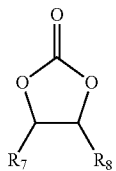

Chemical Formula 2

In Chemical Formula 2, $R_7$ and $R_8$ are each independently a hydrogen atom, a halogen, a cyano group (CN), a nitro group ($NO_2$), or a C1 to C5 fluoroalkyl group, where at least one of the $R_7$ and $R_8$ is a halogen, a cyano group (CN), a nitro group ($NO_2$), or a C1 to C5 fluoroalkyl group.

Examples of the ethylene carbonate-based compound include fluoro ethylenecarbonate, difluoro ethylenecarbonate, chloroethylene carbonate, dichloroethylene carbonate, bromoethylene carbonate, dibromoethylene carbonate, nitroethylene carbonate, cyanoethylene carbonate, and the like, but the ethylene carbonate-based compound is not limited thereto. The amount of the vinylene carbonate or the ethylene carbonate-based compound for improving cycle life may be adjusted within an appropriate (e.g., a desirable or suitable) range.

Lithium Salt

The lithium salt, which is dissolved in the non-aqueous organic solvent, supplies lithium ions in the battery, facilitates the basic operation of the rechargeable lithium battery, and improves lithium ion transportation between the positive and negative electrodes. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, where, x and y are natural numbers, LiCl, LiI, $LiB(C_2O_4)_2$ (lithium bis(oxalato)borate; LiBOB) or a combination thereof, which is used as a supporting electrolytic salt, but the lithium salt is not limited thereto. The lithium salt may be used in a concentration of about 0.1 M to about 2.0 M. When the lithium salt is included at the above concentration range, an electrolyte may have good performance and lithium ion mobility due to good electrolyte conductivity and viscosity.

In another embodiment, a rechargeable lithium battery including a positive electrode, a negative electrode and the electrolyte is provided.

Rechargeable lithium batteries may be classified as lithium ion batteries, lithium ion polymer batteries, or lithium polymer batteries depending on the kind of separator and electrolyte used. The battery may also be classified as cylindrical, prismatic, coin-type, pouch-type, or the like depending on the shape of the battery. In addition, the battery may be a bulk type or a thin film type depending on the size of the battery. Structures and manufacturing methods for the lithium battery described in this disclosure may be any suitable structure or manufacturing method used in the art.

FIG. 1 is an exploded perspective view of a rechargeable lithium battery according to one embodiment. Referring to FIG. 1, the rechargeable lithium battery 100 has a cylindrical shape and includes a negative electrode 112, a positive electrode 114, a separator 113 between the positive electrode 114 and the negative electrode 112, an electrolyte impregnated in the negative electrode 112, the positive electrode 114, and the separator 113, a battery case 120, and sealing member 140 sealing the battery case 120. The rechargeable lithium battery 100 is manufactured by sequentially stacking a negative electrode 112, separator 113, and a positive electrode 114, spirally winding them, and housing the wound product in the battery case 120.

The electrolyte is the same (or substantially the same) as described above and, thus, further description thereof is not provided here.

Positive Electrode

The positive electrode 114 includes a current collector and a positive active material layer on (e.g., formed on) the current collector.

The current collector may include Al, but the current collector is not limited thereto.

The positive active material layer includes a positive active material, a binder, and, optionally, a conductive material.

The positive active material may include lithiated intercalation compounds that reversibly intercalate and deintercalate lithium ions. For example, at least one composite oxide of lithium and a metal of cobalt, manganese, nickel, or a combination thereof may be used, and examples thereof may include a compound represented by one of the following chemical formulae, but the positive active material is not limited thereto. $Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $Li_aE_{2-b}R_bO_{2-c}D_c$ (0.90≤a≤1.8, 0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aN_{ib}E_cG_dO_2$ (0.90≤a≤1.8, 0≤b≤0.9, 0≤c≤0.5 and 0.001≤d≤0.1); $Li_aNi_bCo_cMn_dG_eO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above Chemical Formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

The positive active material may include a coating layer, or a combination of the positive active material and a positive active material coated with a coating layer. The coating layer may include a coating element compound such as an oxide of the coating element, a hydroxide of the coating element, an oxyhydroxide of the coating element, an oxycarbonate of the coating element, or a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any suitable processes used in the art (e.g., spray coating, immersing) as long as it does not cause any side effects (e.g., substantial and undesirable side effects) on the properties of the positive active material. Such coating processes should be apparent to persons having ordinary skill in this art, so further description thereof is not provided here.

The binder improves the binding properties of the positive active material particles with one another and with the current collector. Examples thereof may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material improves the electrical conductivity of the electrode. Any suitably electrically conductive material may be used as the conductive material, unless it causes a chemical change in the battery. Examples thereof may include one or more of natural graphite, artificial graphite, carbon black, acetylene black, ketjen black, carbon fiber, a metal powder, a metal fiber, and/or the like of copper, nickel, aluminum, silver, and/or the like, a conductive material such as a polyphenylene derivative and/or the like, but the conductive material is not limited thereto.

Negative Electrode

The negative electrode 112 includes a current collector and a negative active material layer on (e.g., formed on) the current collector, and the negative active material layer includes a negative active material.

The negative active material includes a material that reversibly intercalates/deintercalates lithium ions, a lithium metal, a lithium metal alloy, a material capable of doping and dedoping lithium, and/or a transition metal oxide.

The material that reversibly intercalates/deintercalates lithium ions may be a carbon material, and may be any suitable carbon-based negative active material generally used in a rechargeable lithium ion secondary battery. Examples thereof may include crystalline carbon, amorphous carbon, or a combination thereof, but the carbon material is not limited thereto. The crystalline carbon may be non-shaped, or may be sheet, flake, spherical, or fiber shaped natural graphite or artificial graphite. The amorphous carbon may be soft carbon, hard carbon, mesophase pitch carbonized products, fired coke, and/or the like.

The lithium metal alloy may be an alloy of lithium and a metal of Na, K, Rb, Cs, Fr, Be, Mg, Ca, Sr, Si, Sb, Pb, In, Zn, Ba, Ra, Ge, Al, and/or Sn.

The material capable of doping and dedoping lithium may be Si, $SiO_x$ ($0<x<2$), a Si—C composite, a Si-Q alloy (where Q is an alkali metal, an alkaline-earth metal, a Group 13 to 16 element, a transition metal, a rare earth element, or combination thereof, and Q is not Si), Sn, $SnO_2$, a Sn—C composite, a Sn—R alloy (where R is an alkali metal, an alkaline-earth metal, a Group 13 to 16 element, a transition metal, a rare earth element, or a combination thereof, and R is not Sn), and/or the like, but the material capable of doping and dedoping lithium is not limited thereto. Examples of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, and/or the like, but the transition metal oxide is not limited thereto.

The negative active material layer includes a binder, and may further, optionally, include a conductive material.

The binder improves the binding properties of the negative active material particles with one another and with the current collector, and examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves the electrical conductivity of the electrode. Any suitably electrically conductive material may be used as the conductive material, unless it causes a chemical change in the battery. Examples thereof may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof, but the conductive material is not limited thereto.

The current collector may include a copper foil, a nickel foil, a stainless steel foil, a titanium foil, a nickel foam, a copper foam, a polymer substrate coated with a conductive metal, or a combination thereof, but the current collector is not limited thereto.

The negative electrode 112 and the positive electrode 114 may each be fabricated by a method including mixing the active material, the binder, and the conductive material to provide an active material slurry, and coating the active material slurry on a current collector. The electrode manufacturing method is apparent to those of ordinary skill in the art, and thus, the electrode manufacturing method is not described in more detail here. The solvent includes N-methylpyrrolidone and the like, but the solvent is not limited thereto.

Separator

A rechargeable lithium battery according to one embodiment may include a separator 113. The separator may include any suitable material generally used in a lithium battery so long as the separator is capable of separating the negative electrode from the positive electrode and is capable of providing a passage for transporting lithium ions. In other words, the separator may have low resistance to ion transportation and good electrolyte impregnation characteristics. For example, the separator may include glass fiber, polyester, TEFLON® (tetrafluoroethylne, TEFLON is a registered trademark of E. I. du Pont de Nemours and Company), polyethylene, polypropylene, polytetrafluoroethylene (PTFE), or a combination thereof, but the separator is not limited thereto. The separator may be a non-woven fabric or a woven fabric. For example, a polyolefin-based polymer separator such as polyethylene, polypropylene or the like is mainly used for a lithium ion battery. In order to ensure (or provide) suitable (or desirable) heat resistance or mechanical strength, a coated separator including a ceramic component or a polymer material may be used. For example, the separator may have a mono-layered or multi-layered structure.

Hereinafter, examples of embodiments of the present disclosure and comparative examples are described. These examples, however, are provided for illustrative purposes only, and should not in any sense be interpreted as limiting the scope of the present disclosure.

Example 1

A positive electrode was manufactured by mixing 97.4 wt % of $LiNi_5Co_2Mn_3O_2$ as a positive active material, 1.3 wt % of polyvinylidene fluoride as a binder, and 1.3 wt % of Denka Black as a conductive material and dispersing the mixture into N-methylpyrrolidone to prepare a positive active material layer composition, followed by coating the positive active material layer composition on an aluminum foil and compressing the coated aluminum foil.

A negative electrode was manufactured by mixing 98 wt % of graphite as a negative active material, 1 wt % of a styrene-butadiene rubber (SBR), and 1 wt % of carboxymethyl cellulose (CMC) as a binder, dispersing the mixture into pure water (or substantially pure water) to prepare a negative active material layer composition, coating the negative active material layer composition on a copper foil, and then drying and compressing the coated copper foil.

An electrolyte was prepared by mixing ethylenecarbonate (EC):ethylmethylcarbonate (EMC):dimethylcarbonate (DMC) in a volume ratio of 1:1:8 and adding $LiPF_6$ in a concentration of 1.3 M into the mixed solution, and adding 1 part by weight of a compound represented by the following Formula 1-1 as an electrolyte additive. Additional components were included in the electrolyte as shown in Table 1 below.

Chemical Formula 1-1

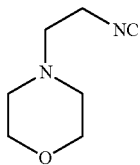

The positive and negative electrodes and a polypropylene separator were put into a battery case, and the electrolyte was injected into the case to manufacture a rechargeable lithium battery cell.

Example 2

A rechargeable lithium battery cell was manufactured as in Example 1 except that 1 part by weight of a compound represented by the following Chemical Formula 1-2 was used as the electrolyte additive, instead of the compound represented by Formula 1-1. Additional components were included in the electrolyte as shown in Table 1 below.

Chemical Formula 1-2

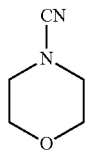

Example 3

A rechargeable lithium battery cell was manufactured as in Example 1 except that 1 part by weight of a compound represented by the following Chemical Formula 1-3 was used as the electrolyte additive, instead of the compound represented by Formula 1-1. Additional components were included in the electrolyte as shown in Table 1 below.

Chemical Formula 1-3

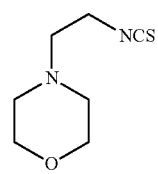

Comparative Example 1

A rechargeable lithium battery cell was manufactured as in Example 1 except that the electrolyte did not include the compound represented by Chemical Formula 1-1 as an electrolyte additive. Additional components were included in the electrolyte as shown in Table 1 below.

Comparative Example 2

A rechargeable lithium battery cell was manufactured as in Example 1 except that 1 part by weight of 4-methylmorpholine represented by the following Chemical Formula a was used as the electrolyte additive, instead of the compound represented by Formula 1-1. Additional components were included in the electrolyte as shown in Table 1 below.

Chemical Formula a

Comparative Example 3

A rechargeable lithium battery cell was manufactured as in Example 1 except that 1 part by weight of 4-hexylmorpholine represented by the following Chemical Formula b was used as the electrolyte additive, instead of the compound represented by Formula 1-1. Additional components were included in the electrolyte as shown in Table 1 below.

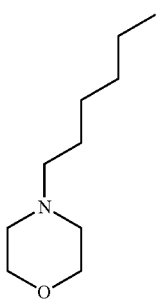

Chemical Formula b

Comparative Example 4

A rechargeable lithium battery cell was manufactured as in Example 1 except that 1 part by weight of ethyl morpholine-4-carboxylate represented by the following Chemical Formula c was used as the electrolyte additive, instead of the compound represented by Formula 1-1. Additional components were included in the electrolyte as shown in Table 1 below.

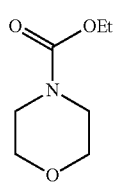

Chemical Formula c

The electrolyte compositions according to Examples 1 to 3 and Comparative Examples 1 to 4 are shown in the following Table 1.

The results are shown in FIGS. 2 to 7.

Figure 2:
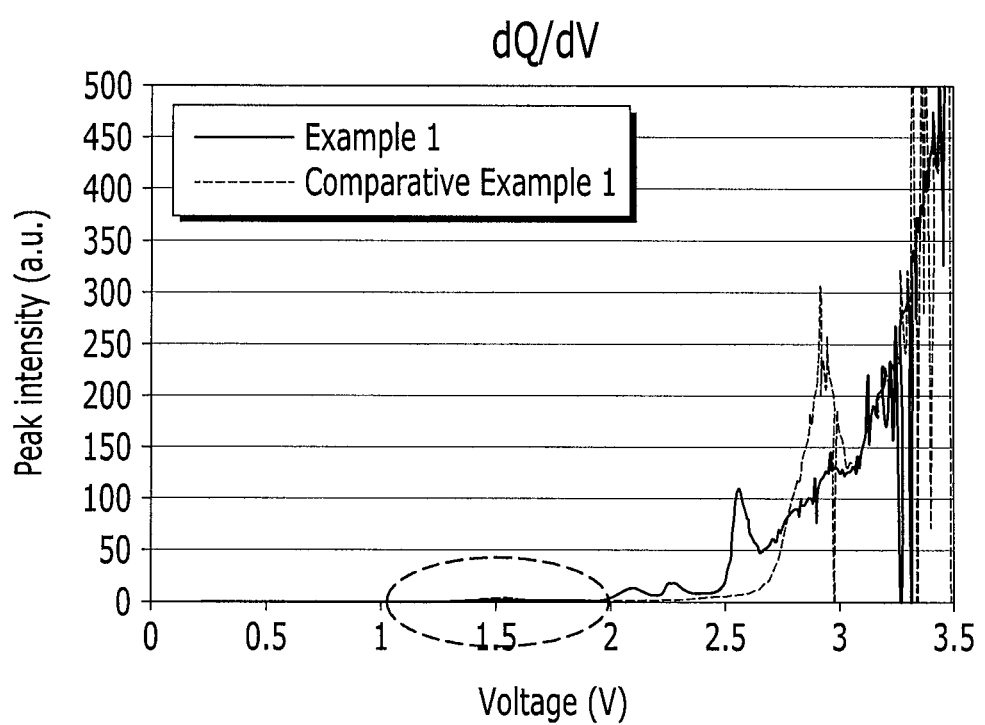
FIG. 2 is a graph showing decomposition potentials of electrolytes according to Example 1 and Comparative Example 1.

FIG. 2 is a graph showing the decomposition potentials of the electrolytes according to Example 1 and Comparative Example 1.

Figure 3:
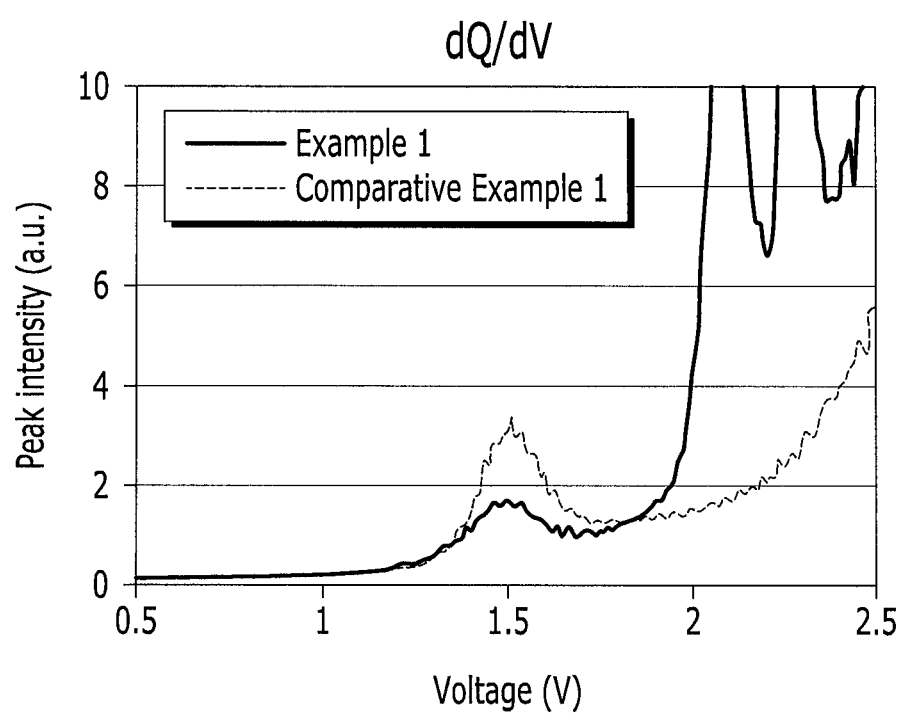
FIG. 3 is an enlarged view of the decomposition potentials of FIG. 2 in a region of about 1 V to about 2 V as indicated by the dashed-line ellipse in FIG. 2.

FIG. 3 is an enlarged view of the decomposition potentials of FIG. 2 in a region of 1 V to 2 V as indicated by the dashed-line ellipse in FIG. 2.

Figure 4:
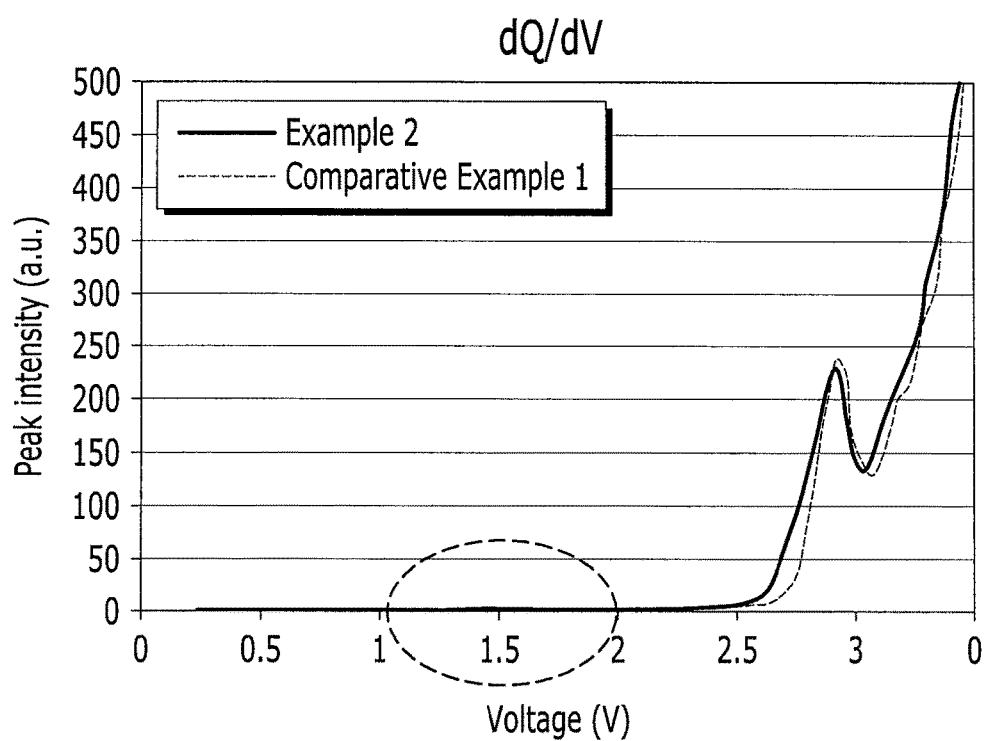
FIG. 4 is a graph showing decomposition potentials of electrolytes according to Example 2 and Comparative Example 1.

FIG. 4 is a graph showing the decomposition potentials of the electrolytes according to Example 2 and Comparative Example 1.

Figure 5:
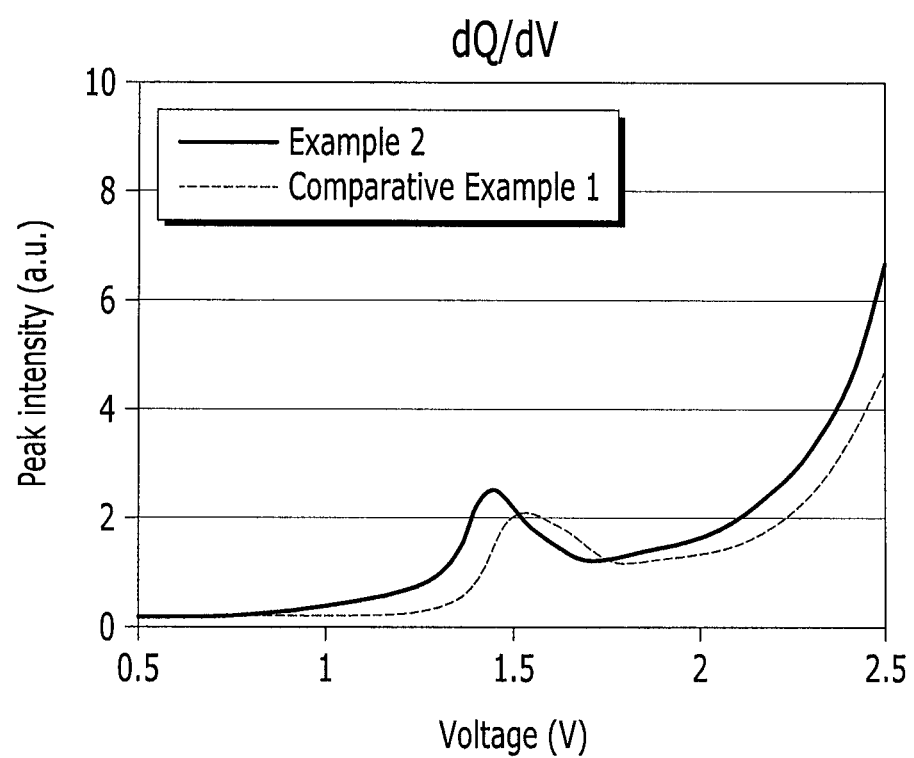
FIG. 5 is an enlarged view of the decomposition potentials of FIG. 4 in a region of about 1 V to about 2 V, as indicated by the dashed-line ellipse in FIG. 4.

FIG. 5 is an enlarged view of the decomposition potentials of FIG. 4 in a region of 1 V to 2 V as indicated by the dashed-line ellipse in FIG. 4.

Figure 6:
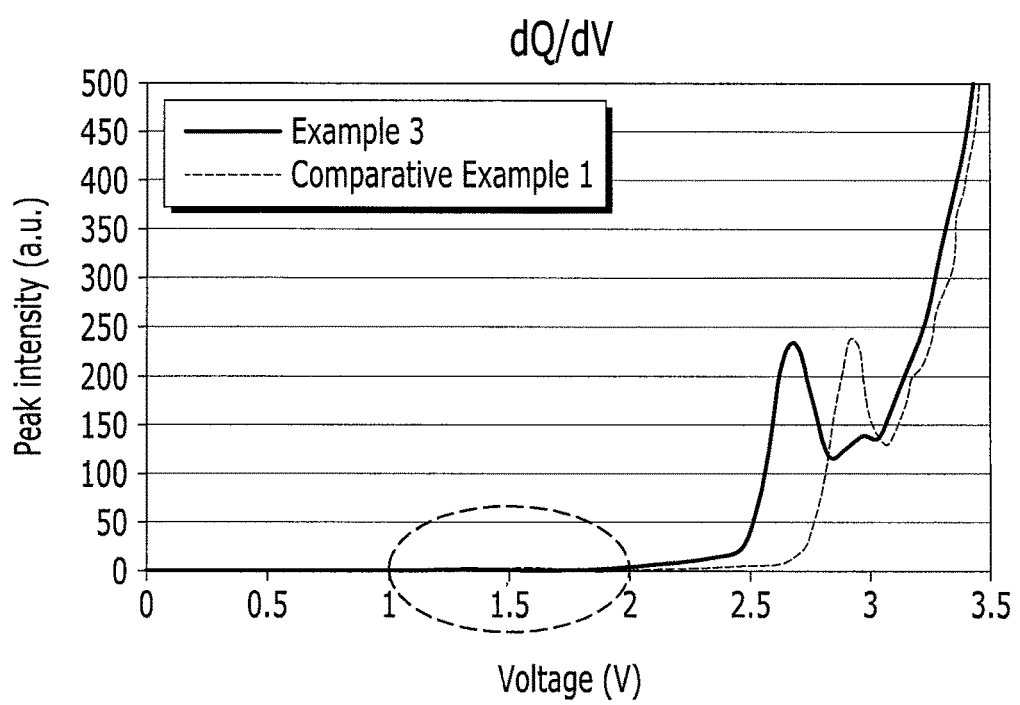
FIG. 6 is a graph showing the decomposition potentials of electrolytes according to Example 3 and Comparative Example 1.

FIG. 6 is a graph showing the decomposition potentials of the electrolytes according to Example 3 and Comparative Example 1.

Figure 7:
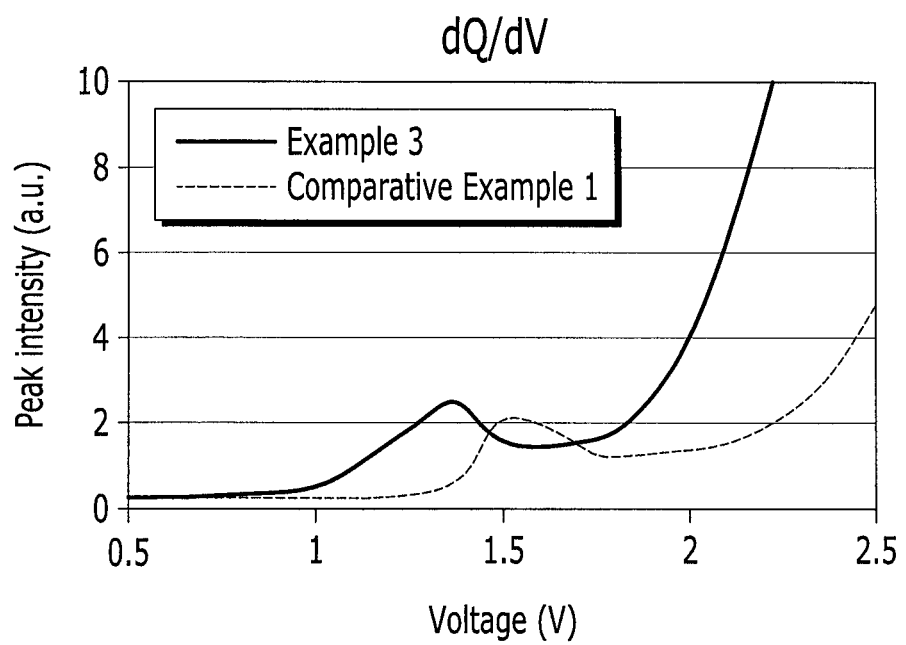
FIG. 7 is an enlarged view of the decomposition potentials of FIG. 6 in a region of about 1 V to about 2 V, as indicated by the dashed-line ellipse in FIG. 6.

FIG. 7 is an enlarged view of the decomposition potentials of FIG. 6 in a region of 1 V to 2 V as indicated by the dashed-line ellipse in FIG. 6.

Referring to FIGS. 2 to 7, the decomposition potentials of the rechargeable lithium battery cell, i.e., full cells prepared as in Examples 1 to 3 started at a lower voltage than the cell prepared as in Comparative Example 1, and SEI protection films were easily formed on the surfaces of the negative electrodes in the rechargeable lithium battery cells prepared as in Examples 1 to 3.

Evaluation 2: Open Circuit Voltage (OCV) Change Before Initial Formation

OCV change characteristics before initial formation of 18650 size full-cells prepared as in Examples 1 to 3 and Comparative Examples 1 to 3 were evaluated.

The OCV of the 18650 cells right after cell assembly and after storage at 25° C. for 24 hours were measured.

Figure 8:
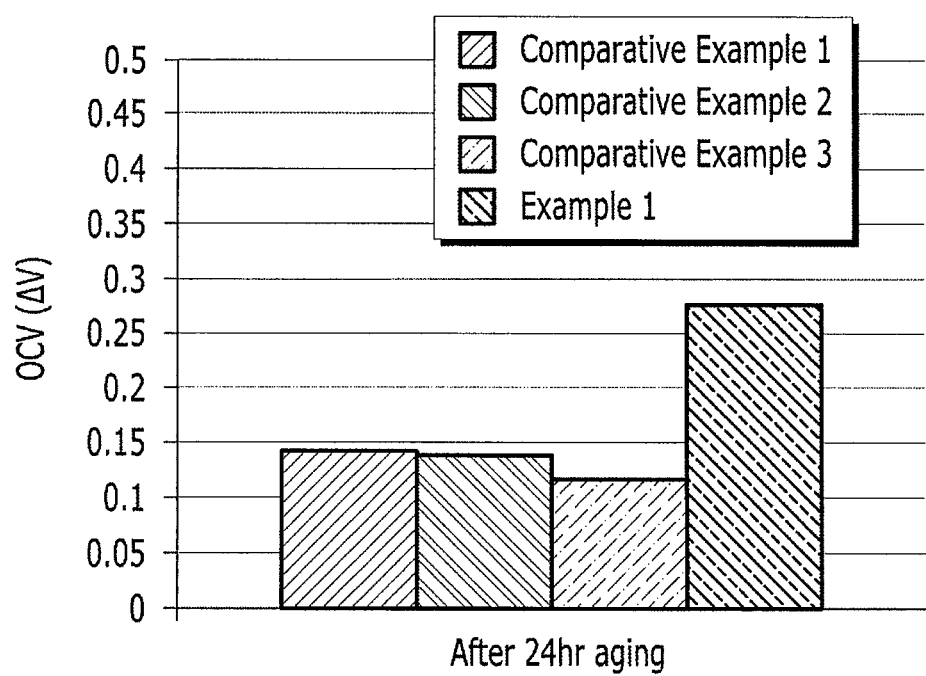
FIG. 8 is a graph showing open circuit voltage (OCV, no load voltage when a battery is not electrically connected to an external circuit) when the 18650 full-cells according to Example 1 and Comparative Examples 1 to 3 were allowed to stand at 25° C. for 24 hours.
Figure 9:
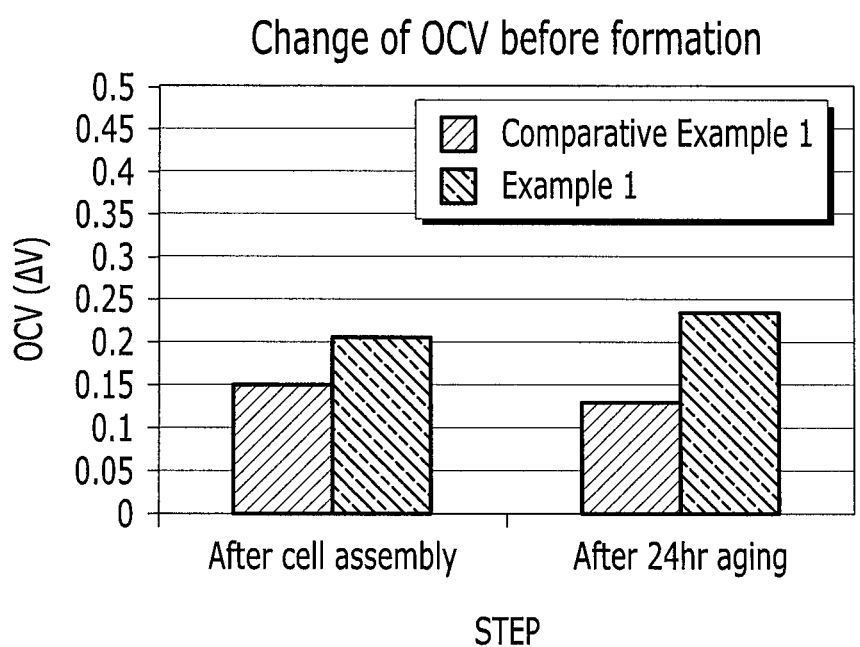
FIG. 9 is a graph comparing OCV right after the 18650 full-cells according to Example 2 and Comparative Example 1 were assembled and OCV when the 18650 full-cells were allowed to stand at 25° C. for 24 hours.

The storage at 25° C. was performed by charging the cells at a charge current of 0.5 C and storing them in a 25° C. thermostatic chamber. Then, the OCV of each battery cell was measured. The results are shown in FIGS. 8 and 9. The

TABLE 1

| | | Examples | | | Comparative Examples | | | |
|---|---|---|---|---|---|---|---|---|
| | Electrolyte | 1 | 2 | 3 | 1 | 2 | 3 | 4 |
| Non-aqueous organic solvent (parts by weight) | EC/EMC/DMC 1:1:8 LiPF$_6$ 1.3M | 100 | 100 | 100 | 100 | 100 | 100 | 100 |
| Additive (parts by weight) | Chemical Formula 1-1 | 1 | — | — | — | — | — | — |
| | Chemical Formula 1-2 | — | 1 | — | — | — | — | — |
| | Chemical Formula 1-3 | — | — | 1 | — | — | — | — |
| | 4-methylmorpholine | — | — | — | — | 1 | — | — |
| | 4-hexylmorpholine | — | — | — | — | — | 1 | — |
| | Ethyl morpholine-4-carboxylate | — | — | — | — | — | — | 1 |
| Other additives | Fluoroethylene carbonate (FEC) | 5 | 5 | 5 | 5 | 5 | 5 | 5 |
| | Vinylethylene carbonate (VEC) | 0.5 | 0.5 | 0.5 | 0.5 | 0.5 | 0.5 | 0.5 |
| | Succinonitrile (SN) | 1 | 1 | 1 | 1 | 1 | 1 | 1 |
| | Lithium tetrafluoroborate (LiBF$_4$) | 0.2 | 0.2 | 0.2 | 0.2 | 0.2 | 0.2 | 0.2 |

Evaluation 1: Formation of SEI Protection Film

The rechargeable lithium battery cells according to Examples 1 to 3 and Comparative Example 1 were charged and discharged at 0.2 C one time each, and formation of a SEI protection film on the surface of a negative electrode was evaluated.

OCV was measured with a HIOKI 3555 Battery HiTester by storing the cells at 25° C., taking the cells out of the 25° C. thermostatic chamber after 24 hours, allowing the cells to stand for 2 minutes, and then measuring the OCV.

FIG. 8 is a graph showing the open circuit voltage (OCV, e.g., the voltage between the terminals of the battery cell when the battery cell is not electrically connected to an external circuit) of the 18650 size full-cells prepared as in Example 1 and Comparative Examples 1 to 3 after being allowed to stand at 25° C. for 24 hours.

FIG. 9 is a graph showing the open circuit voltage measured right after (shortly after) 18650 size full-cells prepared as in Example 2 and Comparative Example 1 were assembled and allowed to stand at 25° C. for 24 hours.

Referring to FIG. 8, the cell according to Example 1 showed an increased OCV compared with the cells according to Comparative Examples 1 to 3 when allowed to stand at 25° C. for 24 hours.

In addition, consistent with the results shown in FIG. 9, the cells prepared as in Examples 1 to 3 showed about 80 to 100% increased OCV before formation as compared with the cells prepared as in Comparative Examples 1 to 3. Without being limited by theory, it is believed that the reason for the improved performance of the cells prepared as in Examples 1 to 3 is that the additive of Examples 1 to 3 had a beneficial influence on the formation of a SEI protection film on the positive and negative electrodes.

Evaluation 3: Penetration Safety

Penetration safety characteristics of the 18650 size full-cells prepared as in Examples 1 to 3 and Comparative Examples 1 to 4 were evaluated.

Two reproducibility experiments were performed for two sets of three 18650 size full-cells. The two sets of three 18650 size full-cells were tested under the same (or substantially the same) conditions.

A penetration safety experiment was performed by charging the cells under a condition of 0.5 C14.2V with a 0.05 C cutoff, penetrating each cell with a pin having a diameter of 2.5 mm at a speed of 80 mm/s, and then noting the degree of combustion of each cell according to a value of L1 to L5. The results are shown in the following Table 2 and FIGS. 10 and 11.

TABLE 2

| | | Penetration safety result | | |
|---|---|---|---|---|
| | Reproducibility | Cell 1 | Cell 2 | Cell 3 |
| Example 1 | First | L1 | L1 | L1 |
| | Second | L1 | L1 | L1 |
| Example 2 | First | L4 | L1 | L1 |
| | Second | L4 | L1 | L1 |
| Example 3 | First | L4 | L1 | L1 |
| | Second | L4 | L1 | L1 |
| Comparative Example 1 | First | L4 | L4 | L4 |
| | Second | L4 | L4 | L4 |
| Comparative Example 2 | First | L4 | L4 | L4 |
| | Second | L4 | L4 | L4 |
| Comparative Example 3 | First | L4 | L4 | L4 |
| | Second | L4 | L4 | L4 |
| Comparative Example 4 | First | L4 | L4 | L4 |
| | Second | L4 | L4 | L4 |

Evaluation Reference (L1: Leakage, L2: <200° C. Exothermic, L3: >200° C. Exothermic, L4: Combustion, L5: Explosion)

Figure 10:
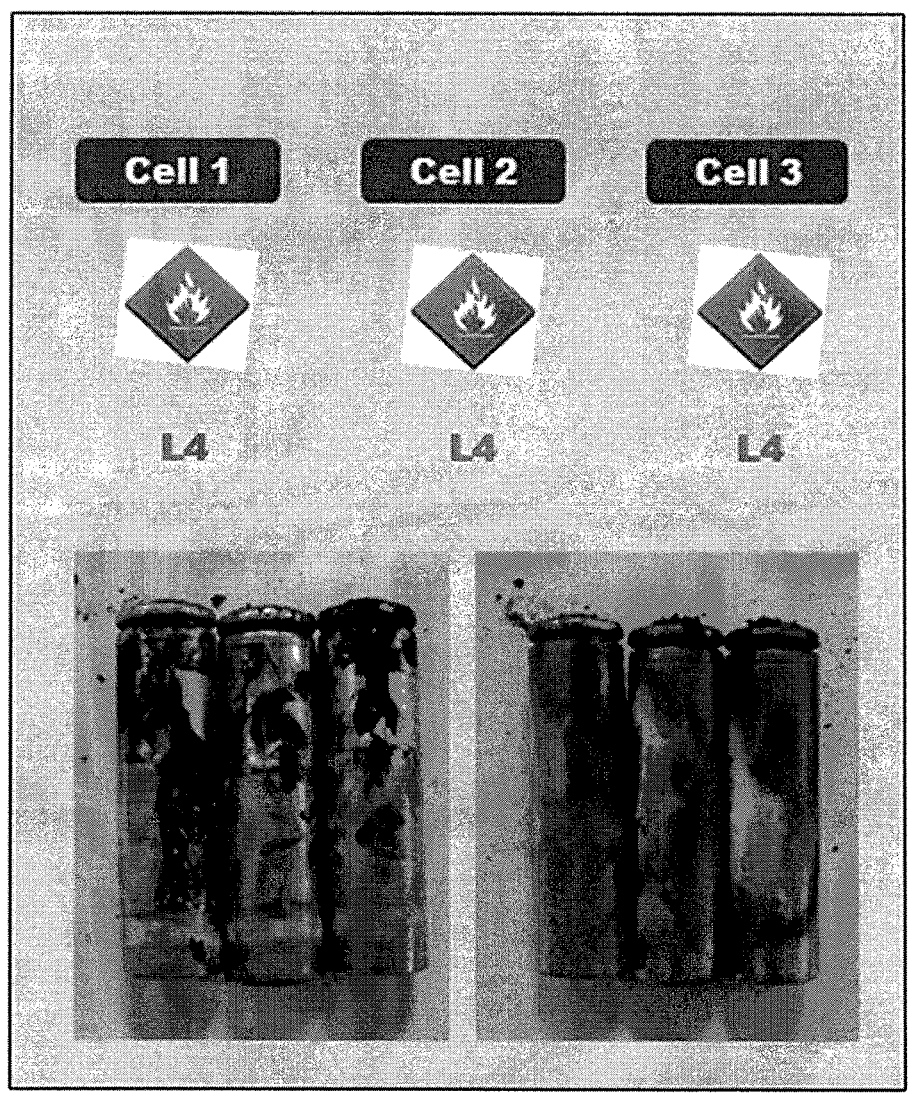
FIG. 10 is a photograph showing a penetration safety experiment result of the 18650 cell according to Comparative Example 1.

FIG. 10 is a photograph showing the results of the penetration safety experiment for the two sets of three 18650 size full-cells prepared as in Comparative Example 1.

Figure 11:
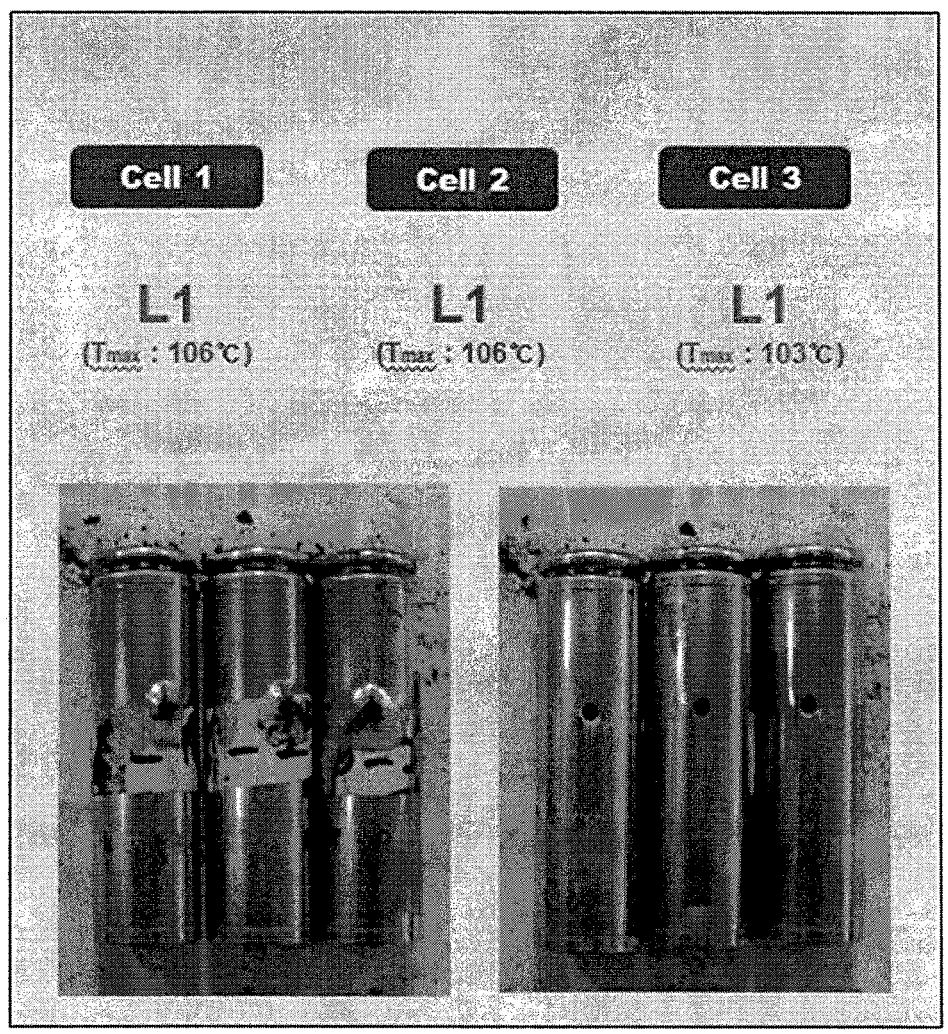
FIG. 11 is a photograph showing a penetration safety experiment result of the 18650 cell according to Example 1.

FIG. 11 is a photograph showing the results of the penetration safety experiment for the two sets of three 18650 size full-cells prepared as in Example 1.

Referring to Table 2 and FIGS. 10 and 11, the 18650 size full-cells prepared as in Examples 1 to 3 showed good penetration safety as compared with the 18650 size full-cells prepared as in Comparative Examples 1 to 4.

Evaluation 4: Accelerating Rate Calorimetry (ARC)

Accelerating rate calorimetry of the battery cells prepared as in Examples 1 to 3 and Comparative Example 1 was evaluated.

(Evaluation Condition)

The 18650 size full-cells were fully charged up to 4.2 V and put in an accelerating rate calorimeter, and a temperature thereof was increased. The temperature was measured in a range of 50 to 400° C. and increased at a rate of 5° C./min, and every temperature increase was performed at a 20 minute interval. When the cells reached a predetermined (e.g., set) temperature, the cells were internally deteriorated and therefore, became self-exothermic and explosive. The time, temperature, and speed from combustion to explosion as the exothermic speed increased were measured.

Figure 12:
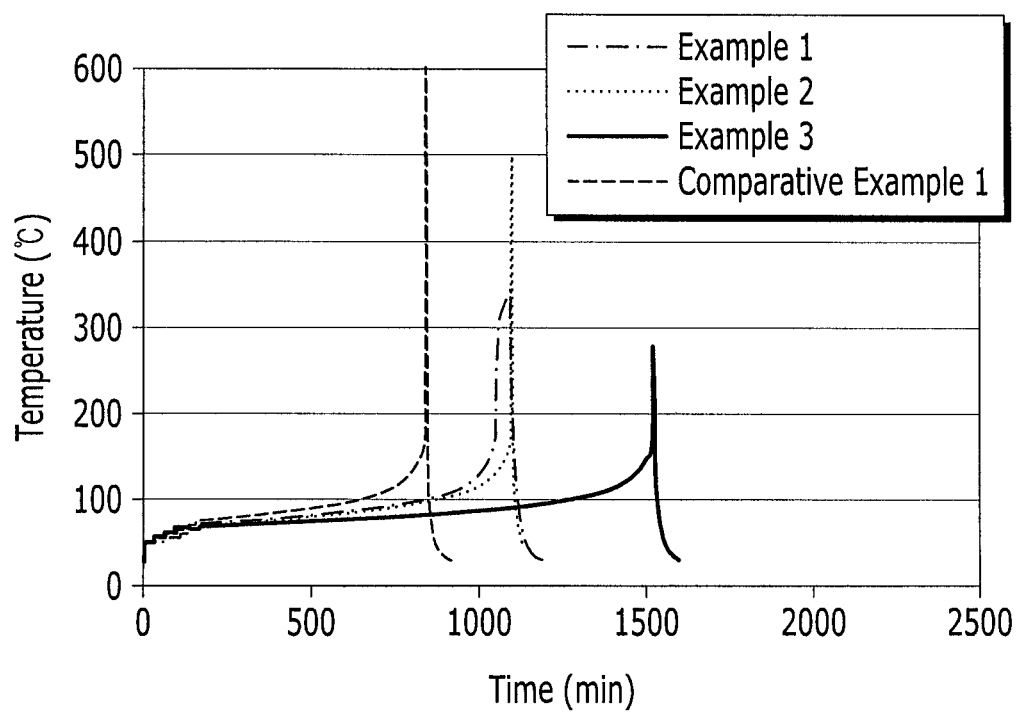
FIG. 12 is a graph showing exothermic time and exothermic accelerating rate of the 18650 cells according to Examples 1 to 3 and Comparative Example 1.

FIG. 12 is a graph showing the results of the exothermic time and the exothermic accelerating rate of the 18650 size cells prepared as in Examples 1 to 3 and Comparative Example 1 using the accelerating rate calorimetry (ARC).

Consistent with the results shown in FIG. 12, the 18650 size full-cells according to embodiments of the present disclosure showed longer combustion times and lower exothermic temperatures than the 18650 size full-cells prepared as in the Comparative Examples.

While this disclosure has been presented in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrolyte for a rechargeable lithium battery comprising:
   a lithium salt;
   a non-aqueous organic solvent; and
   an additive,
   wherein the additive comprises a compound represented by Chemical Formula 1:

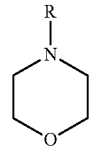

Chemical Formula 1 wherein, in Chemical Formula 1,
   wherein R comprises —CN, —NC, —NCS, —SCN, a C1 to C8 alkyl group substituted with a functional group, a C2 to C12 alkynyl group substituted with a functional group, or a C1 to C12 alkoxy group substituted with a functional group,
   wherein the functional group comprises —CN, —NC, —NCS, or —SCN, and
   wherein the compound represented by Chemical Formula 1 is present in the electrolyte in an amount of about 0.1 parts by weight to about 10 parts by weight based on 100 parts by weight of the non-aqueous organic solvent.

2. The electrolyte for a rechargeable lithium battery of claim 1, wherein the additive comprises an other additive comprising vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluoroborate, vinylethylene carbonate, fluoroethylene carbonate, difluoroethylene carbonate, fluorodimethyl carbonate, fluoroethylmethyl carbonate, or a mixture thereof, wherein the other additive is present in the electrolyte in an amount of about 0.1 parts by weight to about 10 parts by weight based on 100 parts by weight of the non-aqueous organic solvent.

3. A rechargeable lithium battery comprising:

a positive electrode;

a negative electrode; and the electrolyte of claim 1.

4. The rechargeable lithium battery of claim 3, wherein the rechargeable lithium battery comprises a solid electrolyte interface (SEI) protection film on a surface of the negative electrode.

5. The rechargeable lithium battery of claim 3, wherein the rechargeable lithium battery comprises a solid electrolyte interface (SEI) protection film on a surface of the positive electrode.

6. The rechargeable lithium battery of claim 5, wherein the SEI protection film on the surface of the positive electrode comprises a coordination compound comprising a metal comprising Co, Mn, and/or Ni and a functional group coordinated to the metal, the functional group comprising —CN, —NC, —NCS, and/or —SCN.

* * * * *